US012452706B2

(12) United States Patent
Ihira (10) Patent No.: US 12,452,706 B2
(45) Date of Patent: Oct. 21, 2025

(54) ARTICLE TRANSPORT FACILITY (71) Applicant: Daifuku Co., Ltd., Osaka (JP)

(72) Inventor: Yuki Ihira, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 406 days.

(21) Appl. No.: 18/201,370

(22) Filed: May 24, 2023

(65) Prior Publication Data

US 2023/0388821 A1   Nov. 30, 2023

(30) Foreign Application Priority Data

May 25, 2022   (JP) .................................. 2022-085147

(51) Int. Cl.
*H04W 24/04*   (2009.01)
*H04W 16/26*   (2009.01)
*H04W 84/00*   (2009.01)

(52) U.S. Cl.
CPC ........... *H04W 24/04* (2013.01); *H04W 16/26* (2013.01); *H04W 84/005* (2013.01)

(58) Field of Classification Search
CPC ... H04W 24/04; H04W 16/26; H04W 84/005; H04W 4/35; B65G 35/00; B65G 43/10; B65G 1/0457; B65G 2201/0297; H01L 21/6773; H01L 21/67733
See application file for complete search history.

(56) References Cited

U.S. PATENT DOCUMENTS

| | | | |
|---|---|---|---|
| 2019/0014030 A1* | 1/2019 | Thubert | H04W 40/02 |
| 2022/0073277 A1 | 3/2022 | Ueda et al. | |
| 2022/0113698 A1* | 4/2022 | Mirus | G05B 19/4183 |
| 2023/0105698 A1* | 4/2023 | Lowe | G01S 5/0273 |
| | | | 342/451 |
| 2025/0047649 A1* | 2/2025 | Ge | G06N 3/045 |

FOREIGN PATENT DOCUMENTS

| | | |
|---|---|---|
| JP | H58893 B2 | 2/1993 |
| JP | 2003118841 A | 4/2003 |
| JP | 201597346 A | 5/2015 |
| JP | 202245704 A | 3/2022 |

* cited by examiner

*Primary Examiner* — Fayyaz Alam
(74) *Attorney, Agent, or Firm* — The Webb Law Firm (57) ABSTRACT An article transport facility includes a stationary access point being stationary relative to a travel path and connected to a control device to communicate with the control device, and a plurality of mobile access points for wireless communication. Each of the plurality of mobile access points is on a corresponding transport vehicle of a plurality of transport vehicles. Each of the plurality of mobile access points is connected to the stationary access point and another mobile access point to communicate with the stationary access point and the other mobile access point wirelessly. The stationary access point and the plurality of mobile access points form a communication network. The control device and the plurality of transport vehicles communicate data through the communication network.

8 Claims, 7 Drawing Sheets

ARTICLE TRANSPORT FACILITY

CROSS-REFERENCE TO RELATED APPLICATION

This application claims priority to Japanese Patent Application No. 2022-085147 filed May 25, 2022, the disclosure of which is hereby incorporated by reference in its entirety.

BACKGROUND OF THE INVENTION

Field of the Invention

The present invention relates to an article transport facility including multiple transport vehicles and a control device. The multiple transport vehicles travel along a predefined travel path to transport an article. The control device controls the multiple transport vehicles.

Description of Related Art

Japanese Unexamined Patent Application Publication No. 2022-45704 describes an article transport facility (100) including multiple transport vehicles (3) that travel along a predefined travel path (1) to transport an article (W) (reference signs in parentheses in the background are the reference signs in the cited literature). The transport vehicles (3) transport an article (W) in response to a transport command provided from a control device (H1) that controls an overall operation of the article transport facility (100). The control device (H1) and the transport vehicles (3) wirelessly communicate with each other using radio waves.

An access point connected to the control device (H1) allows wireless communication between the control device (H1) and the transport vehicles (3) using radio waves as described above. A communicator in each transport vehicle (3) communicates with the control device (H1) through this access point. For a large article transport facility (100), the control device (H1) cannot communicate with transport vehicles (3) distributed in the facility with a single access point and thus may include a secondary device for the access point installed for relaying communication. A larger article transport facility (100) may include more secondary devices and may thus be costly to install. When the host device and the secondary devices for the access point are connected with wiring, more secondary devices use more wiring. This increases work-hours for installing the article transport facility and thus increases the cost for the installation work for the article transport facility (100). A malfunctioning secondary device cannot communicate until being repaired or replaced. Although failed communication may be reduced by using redundancy such as overlapping coverage areas of secondary devices, such redundancy increases the number of secondary devices to be included and thus increases the cost for installing the article transport facility (100).

SUMMARY OF THE INVENTION

In view of the above, an article transport facility is to include an appropriate communication network between a control device and transport vehicles with less cost increase.

In response to this, an article transport facility includes a plurality of transport vehicles that travel along a predefined travel path to transport an article, a control device that controls the plurality of transport vehicles, a stationary access point being stationary relative to the travel path and connected to the control device to communicate with the control device, and a plurality of mobile access points for wireless communication. Each of the plurality of mobile access points is on a corresponding transport vehicle of the plurality of transport vehicles. The stationary access point has a coverage area reachable by a radio wave for wireless communication. Each of the plurality of mobile access points has a coverage area reachable by a radio wave for wireless communication. The stationary access point is connected to a mobile access point of the plurality of mobile access points within the coverage area of the stationary access point to communicate with the mobile access point wirelessly. Each of the plurality of mobile access points is connected to the stationary access point and another mobile access point within the coverage area of the mobile access point to communicate with the stationary access point and the other mobile access point wirelessly. The stationary access point and the plurality of mobile access points form a communication network. The control device and the plurality of transport vehicles communicate data through the communication network.

The communication network with this structure includes the mobile access points on the respective multiple transport vehicles and the stationary access point. The communication network can cover, without any additional stationary access point, a communication path over a travel path between the transport vehicles and the control device extending over a large area that cannot be reached by radio waves through a single stationary access point. This structure minimizes the number of stationary access points. The communication network for the article transport facility can thus be formed with fewer stationary access points, and uses less wiring between any stationary access points, thus simplifying the installation work for the article transport facility. The article transport facility with the above structure can have an appropriate communication network between the control device and the transport vehicles with less cost increase.

Further features and advantageous effects of the article transport facility will be apparent from exemplary and nonlimiting embodiments described below with reference to the drawings.

DESCRIPTION OF THE INVENTION

Figure 1:
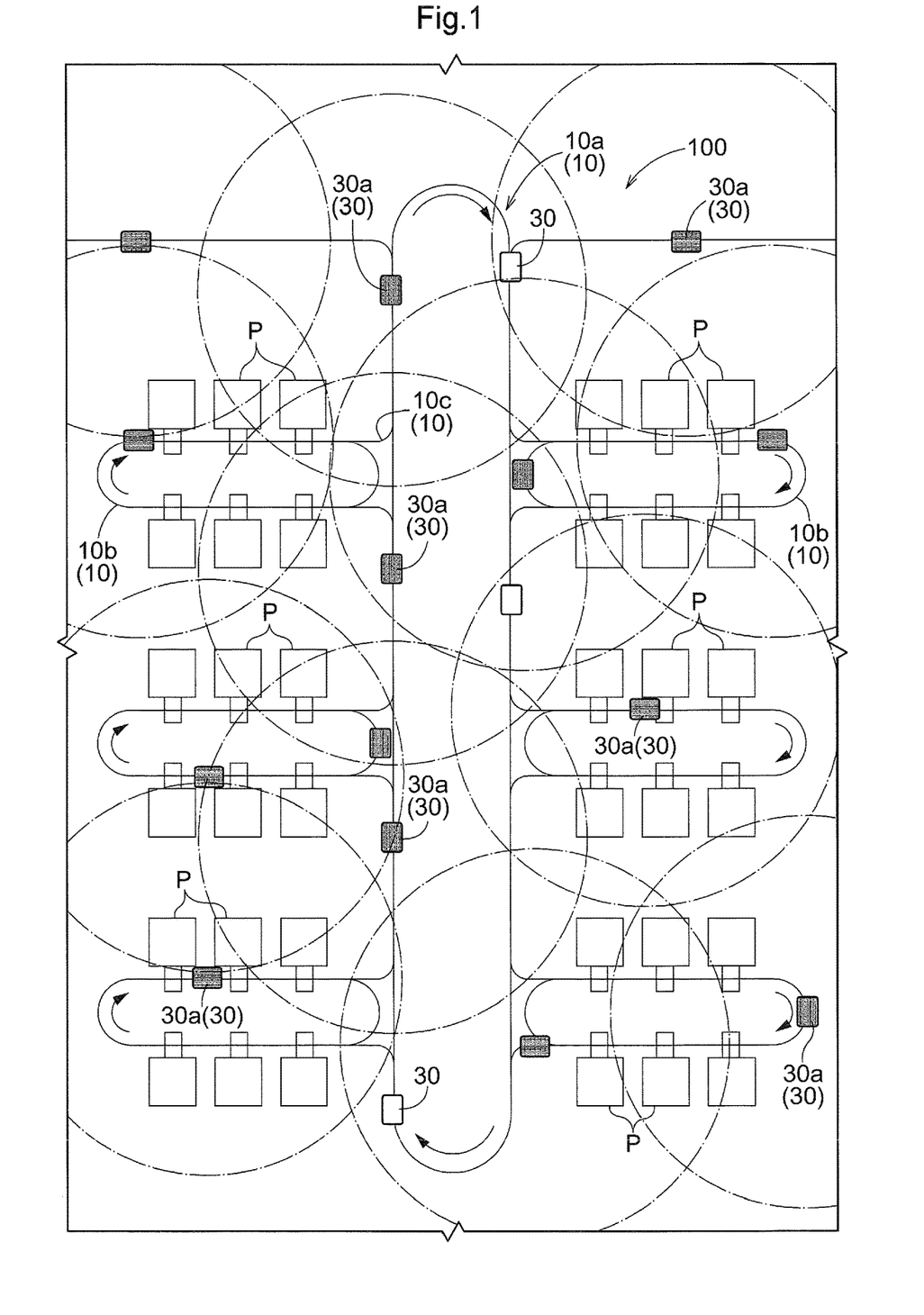
FIG. 1 is a schematic plan view of an article transport facility.
Figure 2:
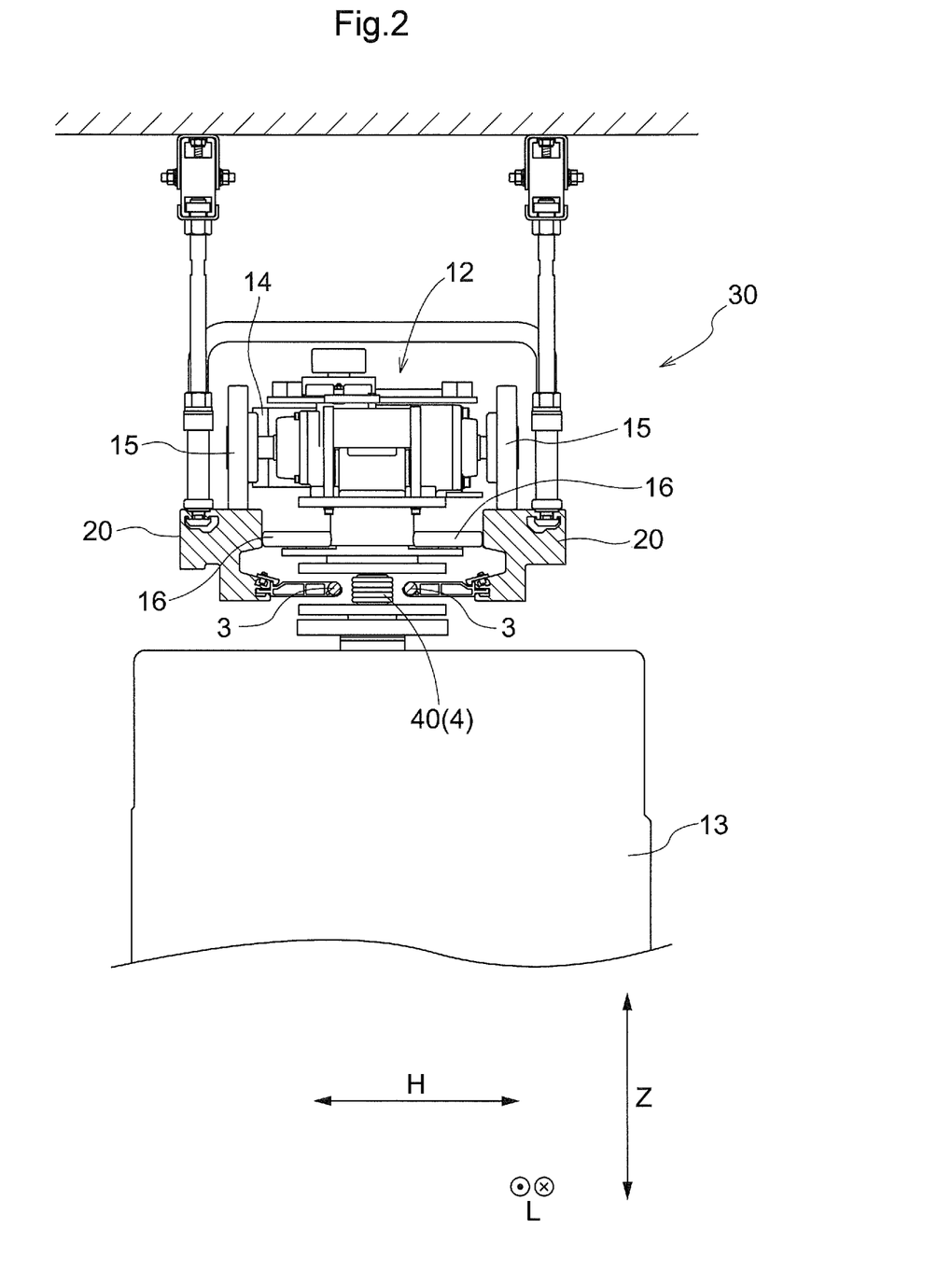
FIG. 2 is a front view of an article transport vehicle.

An article transport facility according to an embodiment will now be described with reference to the drawings. As shown in FIGS. 1 and 2, an article transport facility 100 according to the present embodiment includes travel rails 20 extending along a travel path 10 for transport vehicles 30 that transport articles. As shown in FIG. 2, feed lines 3 extend along the travel rails 20. The article transport facility 100 includes multiple transport vehicles 30. Each transport vehicle 30 is guided by the travel rails 20 to travel along the predefined travel path 10. In the present embodiment, the transport vehicles 30 transport, for example, front opening unified pods (FOUPs) holding semiconductor substrates or glass substrates to be used as a material for displays. The article transport facility 100 also includes a storage (not shown) for semiconductor substrates and article processors P in which circuitry and other components are formed on the semiconductor substrates. The travel path 10 includes, for example, a single looped primary path 10*a*, looped secondary paths 10*b* extending through multiple article processors P, and connecting paths 10*c* connecting these primary and secondary paths 10*a* and 10*b*. In the present embodiment, the transport vehicles 30 travel along the travel path 10 in a single direction as indicated by arrows.

As shown in FIG. 2, each transport vehicle 30 in the present embodiment is a transport vehicle hung from a ceiling and includes a traveler 12 and a body 13. The traveler 12 is guided by a pair of travel rails 20 to travel along the travel path 10. The travel rails 20 are hung from the ceiling and extend along the travel path 10. The body 13 is below the travel rails 20 and is hung from the traveler 12. Although not shown and not described in detail, the body 13 also includes components such as an article support and a grip for an article. The article support is vertically movable and supports an article being hung. The transport vehicle 30 grips an article with the grip and travels with the article support being raised. The transport vehicle 30 also includes a power receiver 4 that contactlessly receives driving power from the feed lines 3 that extend along the travel path 10.

As shown in FIG. 2, the traveler 12 includes a pair of travel wheels 15 that are drivable and rotatable by an electric drive motor 14. The travel wheels 15 roll on the upper surfaces of the travel rails 20 that serve as traveling surfaces. The traveler 12 also includes a pair of guide wheels 16 that are freely rotatable about an axis parallel to the vertical direction Z (about a vertical axis). The guide wheels 16 are in contact with the inner surfaces of the travel rails 20 of the pair. The traveler 12 also includes components such as a drive motor 14 for traveling and a drive circuit for the drive motor 14. The traveler 12 drives the transport vehicle 30 to travel along the travel rails 20. The body 13 includes, for example, components such as an actuator that raises and lowers the article support and an actuator that drives the grip, and drive circuits for these actuators.

The power for components including the drive motor 14, the actuators, and the drive circuits is fed contactless sly from the feed lines 3 to the power receiver 4. As described above, the feed lines 3, which contactlessly feed driving power to the transport vehicle 30 through the power receiver 4, extend along the travel path 10. In the present embodiment, the feed lines 3 are on both sides of the power receiver 4 in a path width direction H perpendicular to a path direction L (perpendicular to both the path length direction L and the vertical direction Z in the embodiment) along the travel path 10. In the present embodiment, wireless power feeding, which is referred to as high-efficiency inductive power distribution (HID), is used to feed driving power to the transport vehicles 30.

Although not shown, the article transport facility 100 includes, on the floor surface, mounts on which an article is placeable. Each transport vehicle 30 picks up an article from or puts an article on a mount with the article support lowered. The mounts are at multiple positions in the article transport facility 100. For example, the mounts are located on the article processors P shown in FIG. 1 and also in an article storage not shown in FIG. 1.

Figure 3:
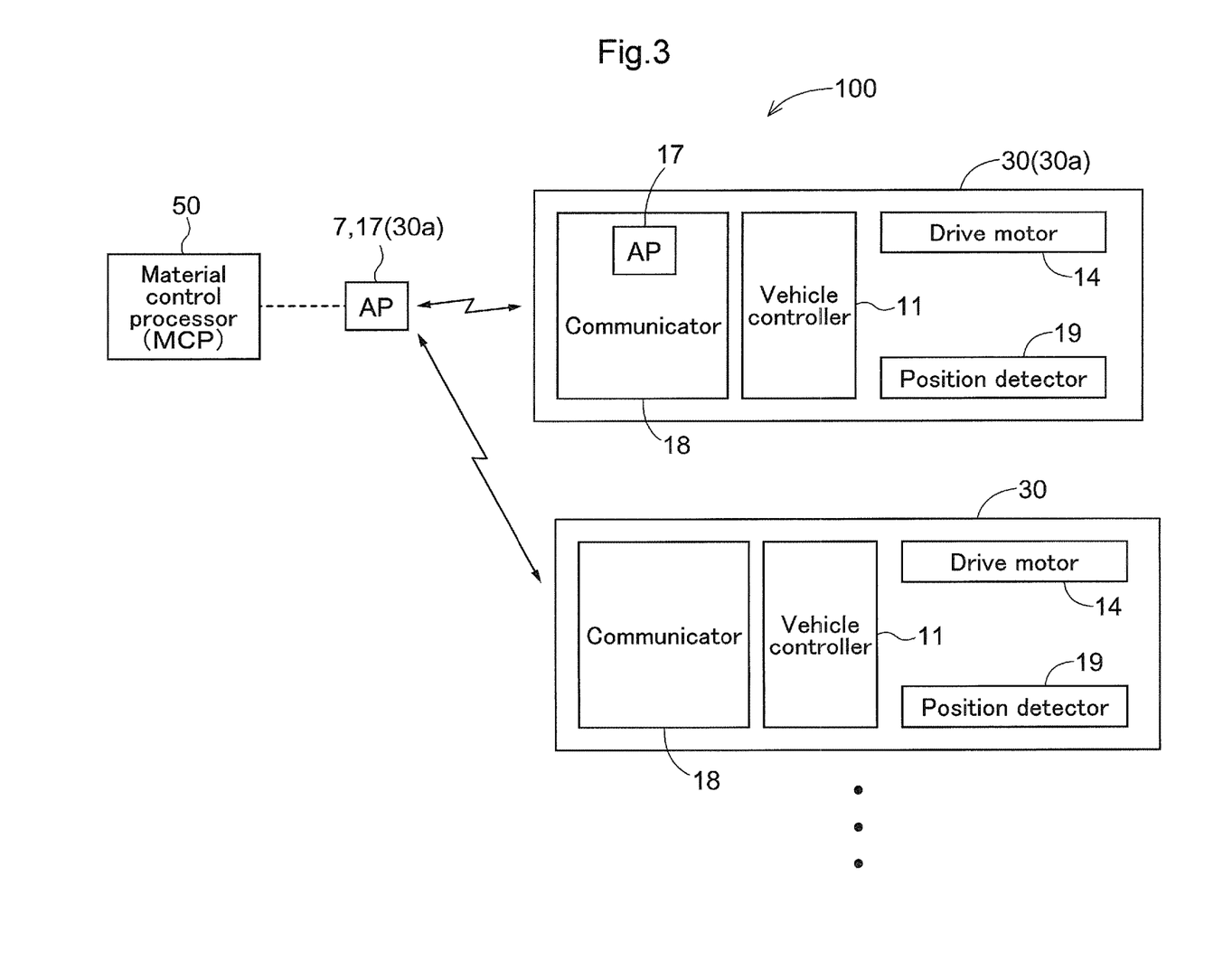
FIG. 3 is a schematic block diagram of the article transport facility, showing the system structure.

As shown in FIG. 3, the article transport facility 100 includes a material control processor (MCP) 50 as a control device for controlling an overall operation of the article transport facility 100. The MCP 50 controls the multiple transport vehicles 30. Each transport vehicle 30 transports an article from one mount to another mount in response to transport commands provided from the MCP 50. The transport commands include an allocation command for instructing the transport vehicle 30 to move to receive an article, and a transportation command for instructing the transport vehicle 30 to transport the received article to a destination. In addition to such transport commands, the MCP 50 also transmits, to the transport vehicles 30, movement commands for instructing the transport vehicles 30 to move without transporting any article. Such movement commands include a command for instructing the transport vehicle 30 to move to avoid obstructing other transport vehicles 30 and a command for instructing the transport vehicle 30 to move to allow communication (described later). The MCP 50 specifies destinations for the transport vehicles 30 in both the transport commands and the movement commands.

Each transport vehicle 30 includes a communicator 18 that allows the MCP 50 and the transport vehicle 30 to communicate wirelessly (e.g., using radio waves). As described in detail later, the MCP 50 and the transport vehicles 30 communicate with each other through access points (stationary access points 7 and mobile access points 17).

Each transport vehicle 30 also includes a position detector 19 that obtains information about the position of the transport vehicle 30 (vehicle position) as vehicle position information. The vehicle position information is transmitted to the MCP 50. This allows the MCP 50 to track the positions of all the transport vehicles 30 in the article transport facility 100. Based on the vehicle position information for each transport vehicle 30 as well as on the travel distances and the degree of congestion of the travel path 10, the MCP 50 determines one of the transport vehicles 30 to transport an article. The MCP 50 then transmits a transport command to the transport vehicle through communication. Each transport vehicle 30 includes a vehicle controller 11 that causes the transport vehicle 30 to travel, stop above the specified mount, and then lower and raise the article support to pick up or put the article through autonomous control in response to a transport command.

The position detector 19 includes, for example, a code reader. In this case, the article transport facility 100 includes, at positions for the transport vehicles 30 to read with the code reader while traveling on the travel path 10 along the travel rails 20, position markers indicating absolute positions inside the article transport facility 100. The position detector 19 obtains information about the positions with the code reader reading these markers. The transport vehicles 30 may also include an encoder that detects the amount of rotation of the travel wheels 15. In sections between position markers indicating positions, the amount of movement of the transport vehicles is detectable based on the amount of rotation detected by the encoder. Such an encoder is also a part of the position detector 19.

Figure 4:
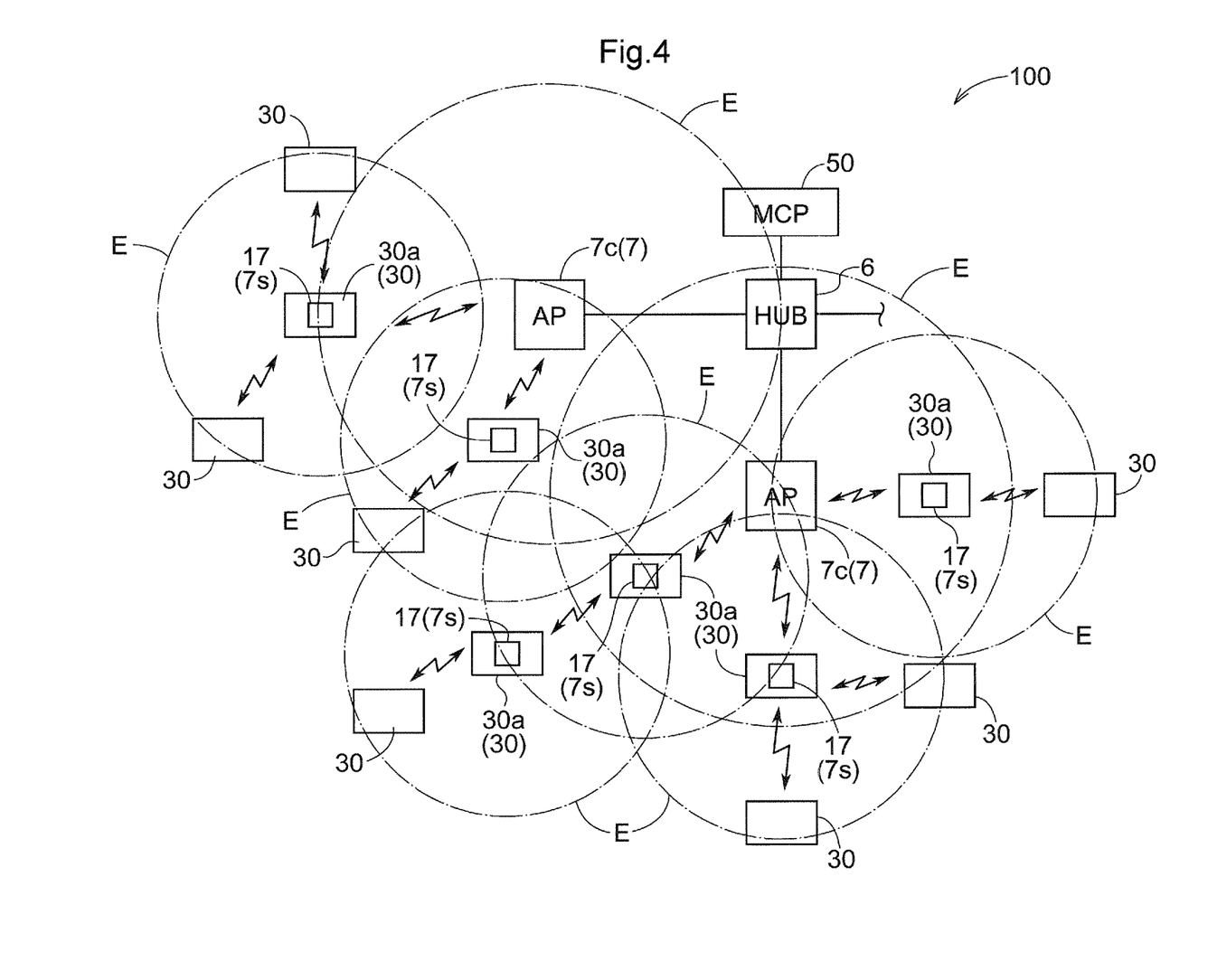
FIG. 4 is a diagram of an example communication network in the article transport facility formed with stationary access points and mobile access points.

FIG. 4 is a diagram of an example communication network in the article transport facility 100. As shown in FIG. 4, the article transport facility 100 includes stationary access points 7 and mobile access points 17 forming a communication network. The stationary access points 7 are stationary relative to the travel path 10. The stationary access point 7 are connected to the MCP 50 to communicate with the MCP 50. In the present embodiment, two stationary access points 7 are connected with wiring to the MCP 50 with a hub 6. Control devices other than the stationary access points 7 may be connected to the hub 6 to communicate with the MCP 50. In some embodiments, the stationary access points 7 may be connected to the MCP 50 wirelessly (with radio wireless communication, near-field wireless communication, or infrared communication). Although the stationary access points 7 are core access points 7c connected to the MCP 50 in the embodiment, the stationary access points 7 may include slave access points 7s that relay communication between the core access points 7c and the transport vehicles 30. The MCP 50 may include built-in stationary access points 7 (core access points 7c).

The mobile access points 17 are not stationary relative to the travel path 10 and are movable. Each mobile access point 17 serves as a slave access point 7s and relays communication between the core access points 7c and the transport vehicles 30, communication between the core access points 7c and the other slave access points 7s, and communication between the other slave access points 7s. In the present embodiment, the mobile access points 17 are each on a different transport vehicle 30.

As shown in FIGS. 3 and 4, not all the transport vehicles 30 may include a mobile access point 17. More specifically, as shown in FIG. 3, the multiple transport vehicles 30 may include transport vehicles 30 each including a mobile access point 17 in the communicator 18 and transport vehicles 30 each including no mobile access point 17 in the communicator 18. For identifying these transport vehicles 30, the transport vehicles 30 each including a mobile access point 17 may be hereafter referred to as access-point carrying transport vehicles 30a. Transport vehicles 30 including no mobile access point 17, with no reference sign for identification in the drawings, may be hereafter referred to as non-access point transport vehicles. A transport vehicle including a mobile access point 17 physically (as a circuit) but its function being disabled can be used as a non-access point transport vehicle. For example, all the transport vehicles 30 may physically include a mobile access point 17. For several transport vehicles 30, the function of the mobile access point 17 may be enabled to cause these transport vehicles 30 to be operable as access-point carrying transport vehicles 30a. When all the transport vehicles 30 are access-point carrying transport vehicles 30a or when all the transport vehicles 30 physically include a mobile access point 17 to serve as access-point carrying transport vehicles 30a, multiple communication paths can be formed easily. Multiple communication paths can facilitate the stability of communication in the article transport facility 100.

As shown in FIGS. 1 and 4, each of the stationary access points 7 and the mobile access points 17 transmits radio waves for wireless communication over a coverage area E. Each stationary access point 7 is connected to any mobile access point 17 within the coverage area E of the stationary access points 7 to communicate with the mobile access point 17 wirelessly. Each of the multiple mobile access points 17 is connected to any stationary access point 7 and any other mobile access point 17 within the coverage area E of the mobile access point 17 to communicate with the stationary access point 7 and the mobile access point 17 wirelessly. The stationary access points 7 (core access points 7c in the present embodiment) and the multiple mobile access points 17 (slave access points 7s in the present embodiment) thus form a communication network.

In other words, a communication network allowing bidirectional communication between the MCP 50 and the transport vehicles 30 includes the mobile access points 17 each within the coverage area E of at least one access point. As described later with reference to FIG. 5, an uncovered area F forms when a mobile access point 17 is outside the coverage area E of any of the other mobile access points 17 and the stationary access points 7.

For simplicity, FIGS. 1 and 4 show several of the mobile access points 17. In the drawings, the multiple mobile access points 17 may each include a mobile access point not in wireless communication with any stationary access point 7 or another mobile access point 17 within the coverage area E of the mobile access point 17.

In this structure, any transport vehicle 30 outside the coverage area E of a stationary access point 7 can have a communication path to the MCP 50 when the transport vehicle 30 is within the coverage area E of at least one mobile access point 17. In other words, a communication path forms to connect the MCP 50 to the transport vehicle 30 through a core access point 7c (stationary access point 7) and at least one slave access point 7s (mobile access point 17). The communication path allows the MCP 50 and the transport vehicle 30 to communicate with each other. More specifically, when the travel path 10 extends over a large area that cannot be reached by radio waves through a single stationary access point 7, a communication network including mobile access points 17 on different transport vehicles 30 and the stationary access points 7 covers any communication path between the transport vehicles 30 and the MCP 50 over this large area, without additional stationary access points 7.

Figure 8:
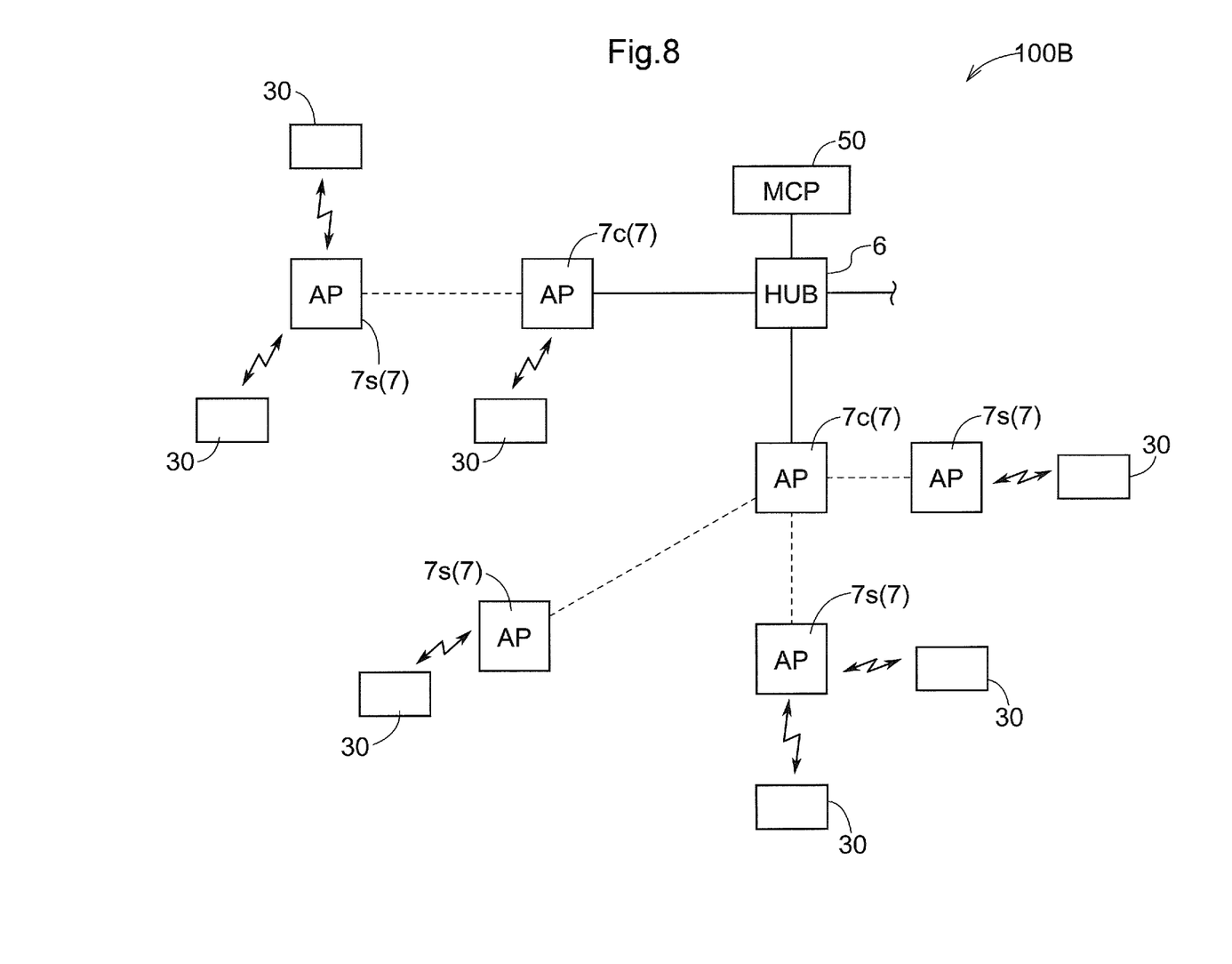
FIG. 8 is a diagram of an example communication network in an article transport facility formed with stationary access points.

FIG. 8 is a diagram of an example communication network in an article transport facility (second article transport facility 100B) in a comparative example. This communication network includes stationary access points 7 including core access points 7c and slave access points 7s. The core access points 7c and the slave access points 7s may be connected to each other with wiring or wirelessly. In the illustrated example, multiple slave access points 7s are stationary relative to the travel path 10 in the second article transport facility 100B in the comparative example to serve as stationary access points 7. A larger article transport facility may include more slave access points 7s and may thus be costly to install. The second article transport facility 100B in the comparative example may thus be more costly to install than the article transport facility 100 according to the present embodiment.

The structure including the core access points 7c and the slave access points 7s in the second article transport facility 100B connected to each other with wiring also increases wiring between the core access points 7c and the slave access points 7s, in addition to increasing the number of slave access points 7s. This increases work-hours for installing the article transport facility and thus increases the cost for installing the article transport facility.

Compared with the second article transport facility 100B in the comparative example, the communication network for the article transport facility 100 according to the present embodiment covers any communication path between the transport vehicles 30 and the MCP 50 in a wide area without additional stationary access points 7. This structure minimizes the number of stationary access points 7. The mobile access points 17 are connected wirelessly rather than with wiring and thus can reduce wiring between the stationary access points 7. This simplifies the installation work for the article transport facility 100. The article transport facility 100 can be expanded without any additional work for the installation and for wiring of stationary access points 7 (slave access points 7s). The use of more transport vehicles 30 may cause insufficient communication capacity for the slave access points 7s. The communication network can be enhanced by increasing the number of transport vehicles 30 each including a mobile access point 17, without additional stationary access points 7. For example, an increase in the number of transport vehicles 30 and thus increased communication through one slave access point 7s may cause congestion on communication paths through the slave access point 7s. The increased number of transport vehicles 30 each including a mobile access point 17 can form multiple communication paths, thus allowing a bypass to form around congested communication paths. The article transport facility 100 according to the present embodiment can reduce congestion in the communication network, and improve the communication environment.

When the slave access points 7s are connected wirelessly to the core access points 7c, a slave access point 7s that is a stationary access point 7 can be placed stationary to constantly allow communication between the slave access point 7s and at least the core access point 7c. However, a slave access point 7s that is a mobile access point 17 may be disabled from communicating with a core access point 7c depending on the position of the mobile access point 17. In other words, a communication path may break. As described above, the MCP 50 can obtain vehicle position information for each transport vehicle 30. Thus, the MCP 50 may control the positions of the multiple transport vehicles 30 to cause each transport vehicle 30 to be within the coverage area E of any of a stationary access point 7 or a mobile access point 17 on another transport vehicle 30.

The communication network including the stationary access points 7 and the mobile access points 17 connects the MCP 50 and the transport vehicles 30, allowing each transport vehicle 30 to communicate with the MCP 50 when the transport vehicle 30 is within the coverage area E of any access point.

Figure 5:
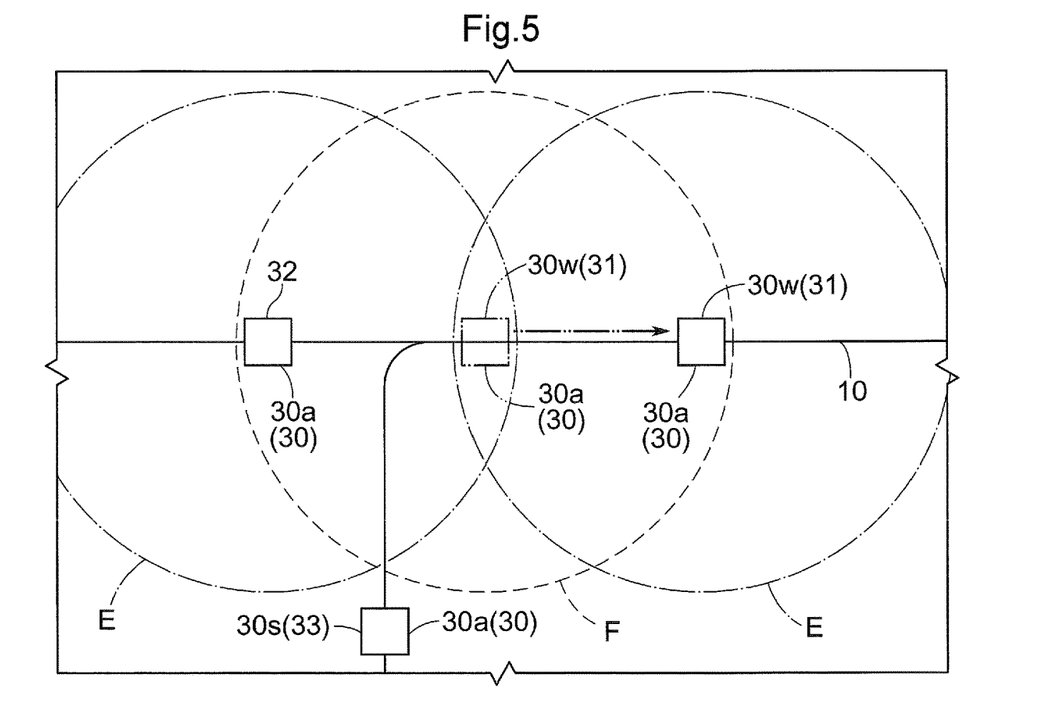
FIG. 5 is a diagram describing an example communication path formed in response to an uncovered area.

As described above, the MCP 50 provides a transport command to a transport vehicle 30. In response to such a transport command, the transport vehicle 30 moves on the travel path When the transport vehicle 30 being an access-point carrying transport vehicle 30a moves, the coverage area E of the transport vehicle 30 also moves. As shown in FIG. 5, an uncovered area F may form when the coverage area E moves.

A transport vehicle 30 receiving a transport command from the MCP 50 is hereafter referred to as a working transport vehicle 30w having an assigned task for transporting an article. A transport vehicle 30 having no assigned task is hereafter referred to as a standby transport vehicle (refer to FIG. 5). In the example described below, all the transport vehicles 30 can serve as mobile access points 17. The multiple transport vehicles 30 each including a mobile access point 17 (access-point carrying transport vehicles 30a) include working transport vehicles 30w each having an assigned task for transporting an article, and standby transport vehicles 30s each having no assigned task.

In FIG. 5, a first transport vehicle 31 that is an access-point carrying transport vehicle has an assigned task for transporting an article. The first transport vehicle 31 and a second transport vehicle 32 are both access-point carrying transport vehicles 30a that function as mobile access points 17. Before such task assignment, the second transport vehicle 32 is within the coverage area E of the first transport vehicle 31, the first transport vehicle 31 is within the coverage area E of the second transport vehicle 32, and a communication path is formed through the first transport vehicle 31 and the second transport vehicle 32.

When the first transport vehicle 31 has an assigned task for transporting an article and moves as a working transport vehicle 30w, the coverage area E also moves together with the first transport vehicle 31. The second transport vehicle 32 does not move in the same direction at the same speed as the first transport vehicle 31. For example, the second transport vehicle 32 is stopped. As the first transport vehicle 31 moves, the second transport vehicle 32 falls outside the coverage area E of the first transport vehicle 31. The first transport vehicle 31 also falls outside the coverage area E of the second transport vehicle 32. This causes the coverage area E formed by the first transport vehicle 31 to be an uncovered area F, thus disconnecting the communication path through the first transport vehicle 31 and the second transport vehicle 32.

The MCP 50 then causes a third transport vehicle 33 to move to the position at which the first transport vehicle 31 stays before moving. The third transport vehicle 33 serves as a standby transport vehicle 30s and also serves as an access-point carrying transport vehicle 30a. The second transport vehicle 32 enters the coverage area E of the third transport vehicle 33. The third transport vehicle 33 enters the coverage area E of the second transport vehicle 32. This forms a communication path through the third transport vehicle 33 and the second transport vehicle 32.

As described above, a working transport vehicle 30w may cause an uncovered area F to form when moving. The uncovered area F is an area covered neither by the coverage area E of a stationary access point 7 nor by the coverage area E of any of the multiple mobile access points 17. The MCP 50 may specify a destination for a standby transport vehicle 30s to allow the coverage area E of the mobile access point 17 on the standby transport vehicle 30s to cover the uncovered area F. A mobile access point 17 on a standby transport vehicle 30s is placed to cover uncovered areas F that have formed or are expected to form. This reduces the likelihood of formation of uncovered areas F. The uncovered areas F are covered to reduce the likelihood that a transport vehicle 30 cannot communicate with the MCP 50 while traveling on the travel path 10.

In the above example, the MCP 50 may specify a destination for the standby transport vehicle 30s not to form, in response to movement of the standby transport vehicle 30s, a second uncovered area, which is an uncovered area F different from the uncovered area F formed by the movement of the first transport vehicle 31. This places the mobile access points 17 to cover the entire article transport facility 100 without causing a new uncovered area F to form in response to movement of the standby transport vehicle 30s.

In the article transport facility 100, the transport vehicles 30 operate mainly to transport an article. Assigning a task of transporting an article to the transport vehicles 30 causes access-point carrying transport vehicles 30a to move frequently. The MCP 50 may perform distributed position control by specifying destinations for multiple transport vehicles 30 each including a mobile access point 17 (access-point carrying transport vehicles 30a) to allow the coverage area E of the stationary access point 7 and the coverage area E of each mobile access point 17 to maintain a communication path throughout the travel path 10.

Distributed position control is optional. A destination may be specified for each access-point carrying transport vehicle 30a to eliminate any uncovered area F that has formed or is expected to form. However, distributed position control performed in advance may eliminate uncovered areas F rapidly. Distributed position control performed in advance may also reduce the likelihood of formation of uncovered areas F. In such control, destinations are specified for the transport vehicles 30 to distribute the mobile access points 17 and constantly maintain communication paths throughout the travel path 10. Transport vehicles 30 traveling on the travel path 10 may remain enabled to communicate with the MCP 50 through one or more access points. In other words, this structure reduces failures of communication between the MCP 50 and a transport vehicle 30.

Figure 6:
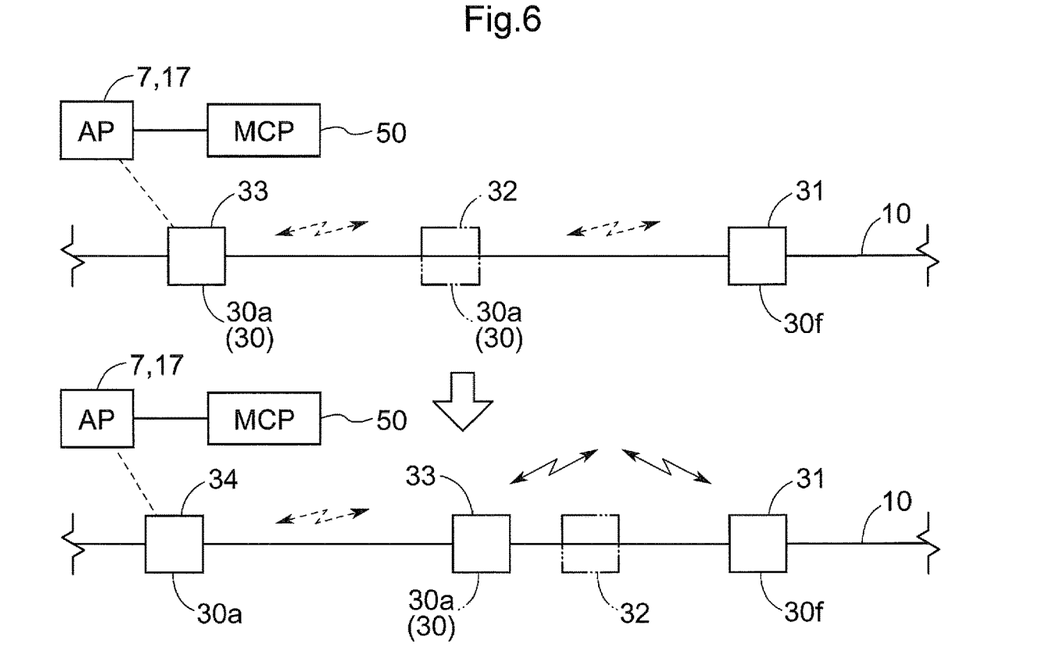
FIG. 6 is a diagram describing an example communication path formed in response to a transport vehicle being disconnected.

A malfunctioning mobile access point 17 on an access-point carrying transport vehicle may also disconnect a communication path. In response to, for example, a failure in communication with one of the multiple transport vehicles 30, the MCP 50 determines that the transport vehicle 30 is a disconnected transport vehicle 30f (refer to FIG. 6). In FIG. 6, a first transport vehicle 31 is a disconnected transport vehicle 30f. The upper part of FIG. 6 shows an example communication path from a stationary access point 7 or a mobile access point 17 to the first transport vehicle 31 formed using a third transport vehicle 33 and a second transport vehicle 32 as mobile access points 17. In response to a failure in communication with the first transport vehicle 31 in this state, the MCP 50 determines that the first transport vehicle 31 is a disconnected transport vehicle 30f.

As described above, the communication path to the first transport vehicle 31 includes the second transport vehicle 32 and the third transport vehicle 33. The MCP 50 can locate a seemingly disconnected communication path (the second transport vehicle 32 in the illustrated example) based on the relationship between the position of a transport vehicle 30 in successful communication (the third transport vehicle 33 in the illustrated example) and the last identified position of the disconnected transport vehicle 30f. In response to a malfunction in the mobile access point 17 in the communicator 18, the MCP 50 may instruct, for example, the second transport vehicle 32 and the third transport vehicle 33 to diagnose the function of the mobile access point 17 as an access point and obtain the diagnosis result.

In response to a malfunction detected in the mobile access point 17 on the second transport vehicle 32, the MCP 50 uses another access-point carrying transport vehicle 30a to replace the second transport vehicle 32 to form the communication path. As shown in the lower part of FIG. 6, for example, the MCP 50 moves the second transport vehicle 32 and drives the third transport vehicle 33 to the position at which the second transport vehicle 32 stays before moving. The MCP 50 further drives a fourth transport vehicle 34, which is an access-point carrying transport vehicle 30a, to the position at which the third transport vehicle 33 stays before moving. The fourth transport vehicle 34 and the third transport vehicle 33 then serve as mobile access points 17 in a communication path from the stationary access point 7 or the mobile access point 17 to the first transport vehicle 31.

In response to a failure in communication with one of the multiple transport vehicles the MCP 50 may determine that this transport vehicle 30 with a failure in communication is a disconnected transport vehicle 30f. The MCP 50 may specify a destination for a transport vehicle 30 including a mobile access point 17 to allow the mobile access point 17 to form a communication path between a stationary access point 7 and the disconnected transport vehicle 30f. A disconnected transport vehicle 30f may cause a disconnection of a communication path. As described above, the MCP 50 can locate the seemingly disconnected communication path. The MCP 50 can also place a mobile access point 17 at a position at which the mobile access point 17 can restore the seemingly disconnected communication path. The mobile access point 17 then restores the seemingly disconnected communication path. This allows communication between the MCP 50 and the disconnected transport vehicles 30f and eliminates the failure in communication.

A failure in communication with one of the multiple transport vehicles 30 may be a failure in communication with at least one of the multiple transport vehicles 30, including, for example, a failure in communication with two or more transport vehicles 30. A failure in communication with a transport vehicle 30 is not limited to the period during which the communication is completely disabled, but may be a situation in which failures in communication occur frequently. Similarly, a failure in communication with two or more transport vehicles 30 may not be a failure to communicate with two or more transport vehicles 30 simultaneously, but may be a situation in which failures in communication with two or more transport vehicles 30 occur frequently. In some embodiments, multiple transport vehicles 30 each including a mobile access point 17, rather than one transport vehicle 30, may be moved to positions at which the mobile access points 17 can form a communication path between the MCP 50 and the disconnected transport vehicle 30f. In other words, the MCP 50 may move at least one transport vehicle 30 including a mobile access point 17 to a position at which the mobile access point 17 can form a communication path between the MCP 50 and the disconnected transport vehicle 30f.

The article transport facility 100 may involve communication between various devices. The article transport facility 100 may thus have radio interference that may cause a failure in communication. More specifically, a failure in communication may occur in a communication path extending through a slave access point 7s in normal operation without any failure. A failure in communication may not occur in a single transport vehicle 30 but may occur between different transport vehicles 30 in situations with radio interference. The MCP 50 may determine that the transport vehicle 30 with a failure in communication is a disconnected transport vehicle 30f. The MCP 50 may then move a transport vehicle 30 including a mobile access point 17 to a position at which the mobile access point 17 can form a communication path between the MCP 50 and the disconnected transport vehicle 30f. This forms another communication path extending through the moved transport vehicle 30 including a mobile access point 17. As described above, multiple transport vehicles 30 each including a mobile access point 17, rather than one transport vehicle 30, may be moved. The multiple transport vehicles 30 are moved to form multiple communication paths. Such multiple communication paths can thus be maintained in situations involving, for example, radio interference, thus easily reducing radio interference affecting communication. The transport vehicles 30 may each move from a position at which, for example, radio interference is less likely to occur, or a position at which a failure in communication is less likely to occur.

Failures in communication may occur in a predetermined pattern based on, for example, the structure and the status of the operation of the article transport facility 100 and the relative positions of the transport vehicles 30. For example, artificial intelligence (AI) may be used to cause the MCP 50 to learn the likelihood and expected positions of radio interference. The MCP may use the results to control transport vehicles 30 each including a mobile access point 17.

As described above, the multiple transport vehicles 30 include access-point carrying transport vehicles 30a each including a mobile access point 17, and non-access point transport vehicles each including no mobile access point 17. The MCP 50 assigns a task for transporting an article to the non-access point transport vehicles in a manner prioritized over the access-point carrying transport vehicles 30a to reduce uncovered areas F. In the article transport facility 100, the transport vehicles 30 are used mainly to transport an article. This causes the access-point carrying transport vehicles 30a to transport an article less frequently than the non-access point transport vehicles, thus reducing movement of access-point carrying transport vehicles 30a. Thus, a communication path between the MCP 50 and a transport vehicle 30 is less likely to be disconnected by movement of a mobile access point 17. This maintains a stable communication environment in the communication network.

Figure 7:
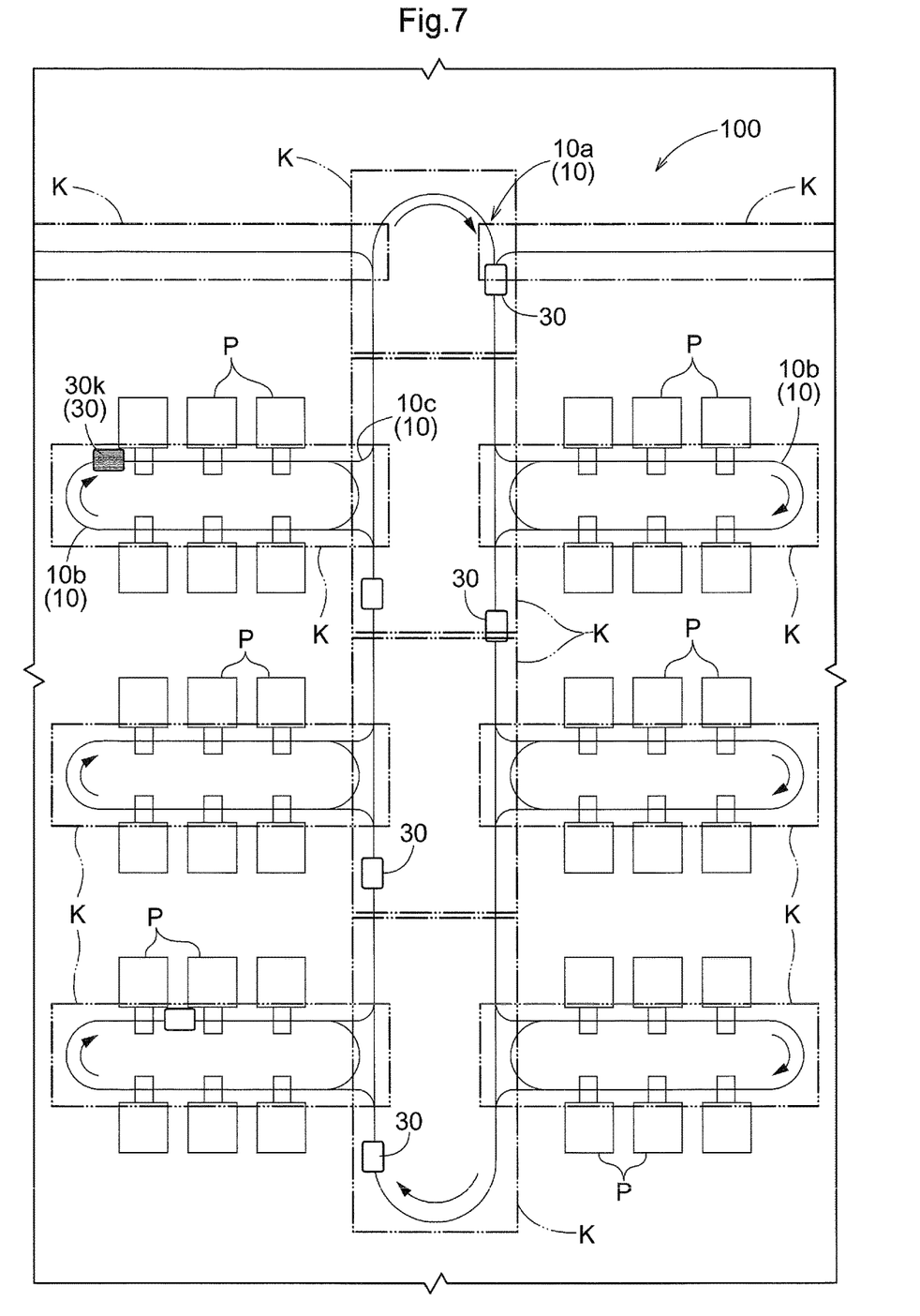
FIG. 7 is a diagram of an example article transport facility having preset control areas.

As illustrated in FIG. 7, the entire travel path 10 may be divided into multiple control areas K. The MCP 50 may assign, as a control transport vehicle 30k, at least one transport vehicle including a mobile access point 17 to each of the multiple control areas K and may cause the control transport vehicle 30k to move within the assigned control area K alone. The control transport vehicles 30k constantly maintain the stable communication environment in the respective control areas K. Thus, a communication path between the MCP 50 and a transport vehicle 30 is less likely to be disconnected. This maintains a stable communication environment in the communication network.

As described above, the travel path 10 in the present embodiment includes a single primary looped path 10a and looped secondary paths 10b extending through multiple article processors P. For example, at least one entire secondary path 10b is defined as a single control area K without being divided to allow a control transport vehicle 30k to easily travel in the control area K. The primary path 10a extends broader than the secondary paths 10b. In the example of FIG. 7, the primary path 10a is divided into multiple control areas K. However, the primary path 10a may also form one control area K, rather than being divided. In this case, multiple control transport vehicles 30k may be distributed throughout the control area K.

When a single control transport vehicle 30k is assigned to a control area K, the coverage area E of the control transport vehicle 30k may constantly cover the entire control area K, irrespective of the control transport vehicle 30k being at any edge of the control area K. For example, when one entire secondary path 10b is defined as a control area K with a single control transport vehicle 30k being assigned to this control area K, the coverage area E of the control transport vehicle 30k may constantly cover the entire secondary path 10b, irrespective of the position of the control transport vehicle 30k on the secondary path 10b.

Other embodiments will now be described. The structure of each embodiment may be combined with the structure of any other embodiments unless any contradiction arises.

(1) In the above embodiment, the transport vehicles 30 are ceiling-hung transport vehicles 30 that are hung from the travel rails 20 installed on the ceiling. When the transport vehicles 30 include transport vehicles 30 each including a mobile access point 17, ground-based article transport vehicles that travel along a travel path 10 on the floor surface may be used instead.

(2) In response to any disconnected transport vehicle 30f, a destination is specified for a transport vehicle 30 including a mobile access point 17 to allow the mobile access point 17 to form a communication path between the MCP 50 and the disconnected transport vehicle 30f in the above embodiment. In some embodiments, the disconnected transport vehicle 30f or any transport vehicle 30 including a mobile access point 17 expected to be malfunctioning on any position on a communication path may be determined to be a failed vehicle and removed from the travel path 10.

(3) In the above embodiment, the entire travel path 10 is divided into multiple control areas K. The MCP 50 assigns, as a control transport vehicle 30k, at least one access-point carrying transport vehicle 30a to each of the multiple control areas K and causes the control transport vehicle 30k to move within the assigned control area K alone. However, the control areas K and the control transport vehicles 30k are optional.

An overview of the article transport facility described above will be described briefly below.

An article transport facility according to an aspect includes a plurality of transport vehicles that travel along a predefined travel path to transport an article, a control device that controls the plurality of transport vehicles, a stationary access point being stationary relative to the travel path and connected to the control device to communicate with the control device, and a plurality of mobile access points for wireless communication. Each of the plurality of mobile access points is on a corresponding transport vehicle of the plurality of transport vehicles. The stationary access point has a coverage area reachable by a radio wave for wireless communication. Each of the plurality of mobile access points has a coverage area reachable by a radio wave for wireless communication. The stationary access point is connected to a mobile access point of the plurality of mobile access points within the coverage area of the stationary access point to communicate with the mobile access point wirelessly. Each of the plurality of mobile access points is connected to the stationary access point and another mobile access point within the coverage area of the mobile access point to communicate with the stationary access point and the other mobile access point wirelessly. The stationary access point and the plurality of mobile access points form a communication network. The control device and the plurality of transport vehicles communicate data through the communication network.

The communication network with this structure includes the mobile access points on the respective multiple transport vehicles and the stationary access point. The communication network can cover, without any additional stationary access point, a communication path over a travel path between the transport vehicles and the control device extending over a large area that cannot be reached by radio waves through a single stationary access point. This structure minimizes the number of stationary access points. The communication network for the article transport facility can thus be formed with fewer stationary access points, and uses less wiring between any stationary access points, thus simplifying the installation work for the article transport facility. The article transport facility with the above structure can have an appropriate communication network between the control device and the transport vehicles with less cost increase.

The control device may control positions of the plurality of transport vehicles to cause each of the plurality of transport vehicles to be within the coverage area of the stationary access point or the coverage area of a mobile access point on another transport vehicle of the plurality of transport vehicles.

The communication network including the stationary access point and the mobile access points connecting the control device and the transport vehicles allows each transport vehicle to communicate with the control device when the transport vehicle is within the coverage area of any of the stationary access point or a mobile access point on another transport vehicle. The positions of the transport vehicles are thus controlled by the control device as described above to allow all the transport vehicles to communicate with the control device through the communication network.

The control device may perform distributed position control by specifying destinations for the plurality of transport vehicles including the plurality of mobile access points to allow the coverage area of the stationary access point and the coverage area of each of the plurality of mobile access points to maintain a communication path throughout the travel path.

The above structure specify destinations for the transport vehicles to distribute the mobile access points to allow communication paths to be constantly maintained throughout the travel path. The transport vehicles traveling on the travel path can thus constantly communicate with the control device through one or more access points. This reduces failures in communication between the control device and the transport vehicles.

In response to a failure in communication with a transport vehicle of the plurality of transport vehicles, the control device may determine that the transport vehicle with the communication failure is a disconnected transport vehicle, and specify a destination for a transport vehicle of the plurality of transport vehicles including a mobile access point to allow the mobile access point to form a communication path between the control device and the disconnected transport vehicle.

A disconnected transport vehicle may cause a disconnection of a communication path. The control device can locate a seemingly disconnected communication path based on the relationship between the position of a transport vehicle in successful communication and the last identified position of the failed transport vehicle. The above structure allows the control device to place a mobile access point at a position at which the mobile access point can restore the seemingly disconnected communication path. The mobile access point then restores the seemingly disconnected communication path. This allows communication between the control device and the disconnected transport vehicles and eliminates the failure in communication.

The plurality of transport vehicles including the plurality of mobile access points may include a working transport vehicle having an assigned task for transporting the article and a standby transport vehicle having no assigned task. In response to movement of the working transport vehicle forming a first uncovered area being an area covered neither by the coverage area of the stationary access point nor by the coverage area of each of the plurality of mobile access points, the control device may specify a destination for the standby transport vehicle to allow the coverage area of a mobile access point on the standby transport vehicle to cover the first uncovered area.

An uncovered area may form when a transport vehicle functioning as a mobile access point moves to transport an article as a working transport vehicle. The above structure places a mobile access point on a standby transport vehicle to cover an uncovered area that has formed or is expected to form. This reduces uncovered areas, thus reducing the likelihood that a transport vehicle cannot communicate with the control device while traveling on the travel path.

In the above structure, the control device may specify a destination for the standby transport vehicle not to form a second uncovered area being an uncovered area different from the first uncovered area in response to movement of the standby transport vehicle.

The above structure allows the mobile access points to be positioned to cover the entire article transport facility without causing a new uncovered area to form when a standby transport vehicle moves to form a communication path in an uncovered area.

The plurality of transport vehicles may include an access-point carrying transport vehicle including a mobile access point and a non-access point transport vehicle including no mobile access point. The control device may assign the task for transporting the article to the non-access point transport vehicle in a manner prioritized over the access-point carrying transport vehicle.

In the article transport facility, the transport vehicles are used mainly to transport an article. This structure causes the access-point carrying transport vehicles to transport an article less frequently than the non-access point transport vehicles, thus reducing movement of access-point carrying transport vehicles. Thus, a communication path between the control device and a transport vehicle is less likely to be disconnected by movement of a mobile access point. This maintains a stable communication environment in the communication network.

The control device may divide the travel path into a plurality of control areas, assign, as a control transport vehicle, at least one transport vehicle of the plurality of transport vehicles including a mobile access point to each of the plurality of control areas, and cause the control transport vehicle to move within an assigned control area of the plurality of control areas.

The above structure allows the control transport vehicles to constantly maintain the communication environment in the respective control areas. Thus, a communication path between the control device and a transport vehicle is less likely to be disconnected. This maintains a stable communication environment in the communication network.

What is claimed is:

1. An article transport facility, comprising:
 a plurality of transport vehicles configured to travel along a travel path to transport an article, with the travel path being predefined;
 a control device configured to control the plurality of transport vehicles;
 a stationary access point that is stationary relative to the travel path, the stationary access point being connected to the control device to communicate with the control device; and
 a plurality of mobile access points for wireless communication, each of the plurality of mobile access points located on a corresponding transport vehicle of the plurality of transport vehicles,
 wherein;
 the stationary access point has a coverage area reachable by a radio wave for wireless communication, and each of the plurality of mobile access points has a coverage area reachable by a radio wave for wireless communication,
 the stationary access point is connected to a mobile access point of the plurality of mobile access points within the coverage area of the stationary access point to communicate with the mobile access point wirelessly, each of the plurality of mobile access points is connected to the stationary access point and another mobile access point within the coverage area of the mobile access point to communicate with the stationary access point and the other mobile access point wirelessly, and the stationary access point and the plurality of mobile access points form a communication network, and the control device and the plurality of transport vehicles communicate data through the communication network.

2. The article transport facility according to claim 1, wherein:

the control device controls positions of the plurality of transport vehicles to cause each of the plurality of transport vehicles to be within the coverage area of the stationary access point or the coverage area of a mobile access point on another transport vehicle of the plurality of transport vehicles.

3. The article transport facility according to claim 1, wherein:

the control device performs distributed position control by specifying destinations for the plurality of transport vehicles including the plurality of mobile access points to allow the coverage area of the stationary access point and the coverage area of each of the plurality of mobile access points to maintain a communication path throughout the travel path.

4. The article transport facility according to claim 1, wherein:

in response to a failure in communication with a transport vehicle of the plurality of transport vehicles, the control device determines that the transport vehicle with the communication failure is a disconnected transport vehicle, and specifies a destination for a transport vehicle of the plurality of transport vehicles including a mobile access point to allow the mobile access point to form a communication path between the control device and the disconnected transport vehicle.

5. The article transport facility according to claim 1, wherein:

the plurality of transport vehicles including the plurality of mobile access points include a working transport vehicle having an assigned task for transporting the article and a standby transport vehicle having no assigned task, and in response to movement of the working transport vehicle forming a first uncovered area being an area covered neither by the coverage area of the stationary access point nor by the coverage area of each of the plurality of mobile access points, the control device specifies a destination for the standby transport vehicle to allow the coverage area of a mobile access point on the standby transport vehicle to cover the first uncovered area.

6. The article transport facility according to claim 5, wherein:

the control device specifies a destination for the standby transport vehicle not to form a second uncovered area being an uncovered area different from the first uncovered area in response to movement of the standby transport vehicle.

7. The article transport facility according to claim 1, wherein:

the plurality of transport vehicles include an access-point carrying transport vehicle including a mobile access point and a non-access point transport vehicle including no mobile access point, and the control device assigns the task for transporting the article to the non-access point transport vehicle in a manner prioritized over the access-point carrying transport vehicle.

8. The article transport facility according to claim 1, wherein:

the control device divides the travel path into a plurality of control areas, assigns, as a control transport vehicle, at least one transport vehicle of the plurality of transport vehicles including a mobile access point to each of the plurality of control areas, and causes the control transport vehicle to move within an assigned control area of the plurality of control areas.

* * * * *

UNITED STATES PATENT AND TRADEMARK OFFICE
CERTIFICATE OF CORRECTION

| | | |
|---|---|---|
| PATENT NO. | : 12,452,706 B2 | Page 1 of 1 |
| APPLICATION NO. | : 18/201370 | |
| DATED | : October 21, 2025 | |
| INVENTOR(S) | : Yuki Ihira | |

It is certified that error appears in the above-identified patent and that said Letters Patent is hereby corrected as shown below:

In the Claims

Column 14, Line 49, Claim 1, after "point" delete "being"

Column 14, Line 56, Claim 1, delete "wherein;" and insert -- wherein: --

Signed and Sealed this
Thirtieth Day of December, 2025

John A. Squires
*Director of the United States Patent and Trademark Office*